United States Patent [19]

Westlund, Jr. et al.

[11] Patent Number: 5,241,238
[45] Date of Patent: Aug. 31, 1993

[54] ELECTRIC LAMP WITH LOW TORQUE THREADED BASE

[75] Inventors: Arnold E. Westlund, Jr., Winchester; Emery G. Audesse, Lexington, both of Ky.

[73] Assignee: GTE Products Corporation, Danvers, Mass.

[21] Appl. No.: 807,484

[22] Filed: Dec. 16, 1991

[51] Int. Cl.$^5$ .......................... H01J 1/88; H01J 61/34; H01J 61/36; H01J 5/50
[52] U.S. Cl. ..................................... 313/25; 313/318; 439/615
[58] Field of Search ................... 313/25, 318; 439/615

[56] References Cited

U.S. PATENT DOCUMENTS

| | | | |
|---|---|---|---|
| 1,650,289 | 11/1927 | McGinley | 313/318 |
| 2,142,072 | 12/1938 | Asmussen et al. | 439/615 |
| 4,020,382 | 4/1977 | Bolt et al. | 313/318 |
| 4,604,553 | 8/1986 | Kosmach | 313/318 |
| 4,647,809 | 3/1987 | Blaiodell et al. | 313/25 |
| 4,779,021 | 10/1988 | Haraden | 313/25 |
| 4,816,977 | 3/1989 | Sorensen | 313/318 |

FOREIGN PATENT DOCUMENTS 0251284  5/1963  Australia ............................ 313/318

Primary Examiner—Donald J. Yusko
Assistant Examiner—N. D. Patel
Attorney, Agent, or Firm—William E. Meyer

[57] ABSTRACT

A double envelope electric lamp having an outer envelope, support frame, inner capsule, threaded base, center contact, is disclosed. The support frame is formed with hooked ends that lie in shall grooves formed through the threads formed on the lamp neck. The exterior arms abut the metal base when the metal base is threaded onto the outer envelope. By making the exterior arms with a heavy wire, the positioning accuracy may be increased, and surprisingly, the threading torque may be reduced.

9 Claims, 2 Drawing Sheets

ELECTRIC LAMP WITH LOW TORQUE THREADED BASE

TECHNICAL FIELD

The invention relates to electric lamps and particularly to electric lamps with internal capsules. More particularly the invention is concerned with an electric lamp with a low assembly torque support frame for an internal capsule.

BACKGROUND ART

A few years ago, tungsten halogen technology was adapted for use in standard lamps. The new tungsten halogen standard lamps have an inner capsule that contains the tungsten halogen process, and an outer envelope that guards against possible non-passive fracture of the inner capsule, and shields the user from the high surface temperature of the inner capsule. The inner capsule is then mounted on a frame inside the outer envelope, with the frame acting as one of the electrical connections for the inner capsule. Tungsten halogen lamps can produce a higher quality light, be more efficient, and have a longer life than ordinary filamented lamps.

During assembly, the frame and inner capsule are inserted in the outer envelope, and the base is screwed on. The threaded base pinches the exterior arms of the frame against the envelope neck to make electrical contact and hold the frame in place. To make good electrical contact, and to ensure the base is not unthreaded, the frame to base contact has been made by a sharp point, aimed in the threading direction. As the base threads over the frame, the frame points dig progressively deeper into the base. In final position, the frame points are well embedded in the base, ensuring electrical contact, and are pointed against the unthreading of the base to prevent removal of the base. Because of variations in the pointed ends, the lengths of the frame components, molded glass dimensions and similar causes, the frame ends do not always contact the base equally. The frame can then be twisted in the outer envelope, leaving the inner capsule misaligned. This is a cosmetic problem. The misalignment can also be a mechanical problem. The misaligned inner capsule can knock against the outer envelope during shipment and break. The life of the inner capsule may also be affected by the irregular heat flow around the adjacent outer envelope. There is then a need for a support frame that consistently centers the inner capsule in the outer envelope.

The double envelope, tungsten halogen lamps are assembled by hand threading the base to the lamp neck. The torque characteristic of lamps with pointed frame ends is not a linear force, but is an increasing and perhaps even an accelerating force. The high torque need to thread the base to its final position may lead to injuries from repeated high stress of the assemblers' fingers, hands or wrists. By reducing the diameter of the support frame wire, the wire may be made more flexible, but a more flexible wire allows greater sway in the assembled lamp. Greater flexibility in the support frame is also likely to result in a bent, or distorted support frame. There is then a need for a double envelope electric lamp with a low assembly torque support frame for the internal capsule that is unlikely to sway or be distorted.

U.S. Pat. No. 4,647,809 issued to Ronald G. Blaisdell et al on Mar. 3, 1987 for a Electric Lamp with Self-Mounting Frame Assembly and Method of Constructing Same shows a support frame for an internal capsule. Blaisdell suggests using either flat metal pieces or thin wires welded together to form a frame. In both instances the frame ends include projections that cut into the base as the base is screwed onto the outer envelope.

DISCLOSURE OF THE INVENTION

An electric lamp may be formed with an outer envelope having a bulb end, and a neck end including formed envelope threads with an envelope thread height. Also formed in the envelope are a first cross groove extending approximately perpendicular to the envelope threads, having a width and a depth approximately equal the envelope thread height and a length greater than two times the envelope thread height, and a similarly formed second cross groove offset from the first cross groove. The lamp also includes a support frame, enclosed in the outer envelope having a first exterior arm and a second exterior arm, having respective dimensions allowing the first cross groove and second cross groove to be closely fit with the respective first exterior arm, and the second exterior arm. The support frame also provides an interior support for an inner capsule and having a light source, a first lead electrically coupled to the support frame, a second lead, the inner capsule being mounted on the support frame. The lamp is closed by a threaded base being threaded to the outer envelope to trap the first exterior arm in the first cross groove and and the second exterior arm in the second cross groove. The base also includes a center contact electrically coupled to the second lead of the tungsten halogen capsule.

BEST MODE FOR CARRYING OUT THE INVENTION

Figure 1:
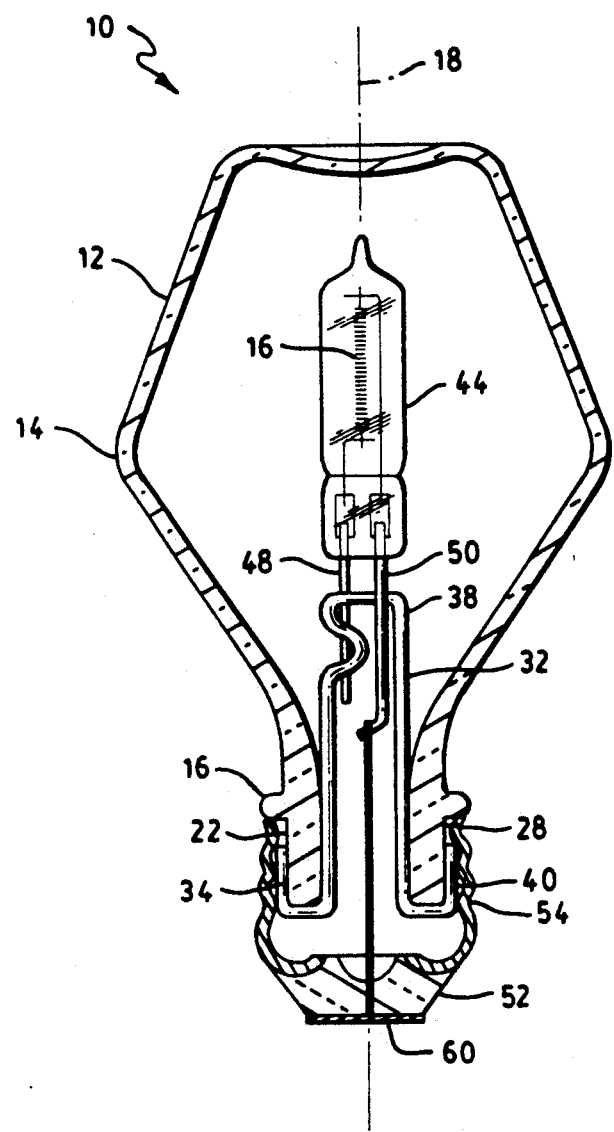
FIG. 1 shows a cross sectional view of a preferred embodiment of an electric lamp with a low torque threaded base.

FIG. 1 shows a cross sectional view of a preferred embodiment of an electric lamp with a low torque threaded base. The electric lamp 10 is assembled from an outer envelope 12, a support frame 32, an inner capsule 44, and a threaded base 52.

Figure 2:
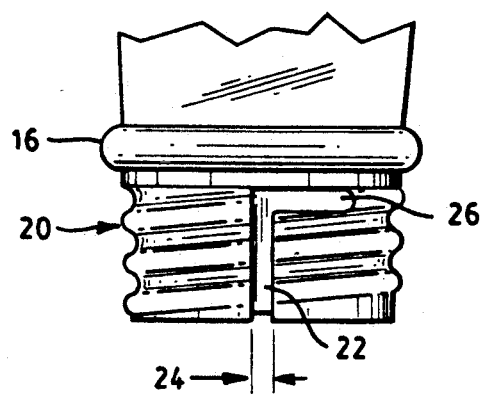
FIG. 2 shows a side view of a threaded lamp neck partially broken away.

The outer envelope 12 has a bulb end 14, a threaded neck end 16 aligned about a lamp axis 18. The bulb end 14 defines an enclosed volume sufficiently large to contain portions of a support frame 32, and an inner capsule 44. The preferred bulb end 14 has the form of a surface of rotation about a lamp axis 18, with a flat top, and two sections in the form of frustra of cones, the second of which narrows to a neck region on which envelope threads 20 are formed. FIG. 2 shows a side view of a threaded lamp neck. The neck end 16 opens to the interior of the bulb end 14 with sufficient diameter to admit portions of a support frame 32, and an inner capsule 44. The preferred neck end 16 is threaded to be compatible with standard lamp sockets. In one embodiment, the threaded neck end 16 had three full threadings.

Extending in the direction of the lamp axis 18, transverse to the envelope threads 20, is a first cross groove 22. Cutting through the envelope threads 20, the first cross groove 22 forms a depression extending below the deepest (root) portion of the envelope threads 20. In the preferred embodiment, the depth of the first cross groove 22 below the deepest portion of the envelope threads 20 is not quite equal to the width of the first cross groove 22.. The first cross groove 22 also extends axially two or more times the width of the first cross groove 22. In the preferred embodiment, the first cross groove 22 extends axially about five times the width of the first cross groove 22. At the axial extent of the first cross groove 22, on the bulb end, extending approximately parallel with the envelope threads 20 and perpendicular to the first cross groove 22 is a lock notch 26. The lock notch 26 may be any indentation formed in the outer envelope 12 in the region of the envelope threads 20. It is convenient to form an extension of the first cross groove 22 so as to be a lock notch 26. The lock notch 26 should be sufficiently large as to allow an indentation of the adjacent threaded base 52 to be made, or for sufficient epoxy to be contained to bind the envelope 12 to the base 52. Since the threaded base 52 is inherently designed to allow thread sized indentations, the lock notch 26 may then have a width and length of about a thread diameter 56. Applicant prefers an even longer lock notch 26. A similar second cross groove 28 is formed on the threaded neck, and preferrably diametrically opposite the location of the first cross groove 22. A corresponding second lock notch 26 may be similarly formed, so the lamp is axially symetric. The axial symmetry is useful in assembly practice.

Figure 3:
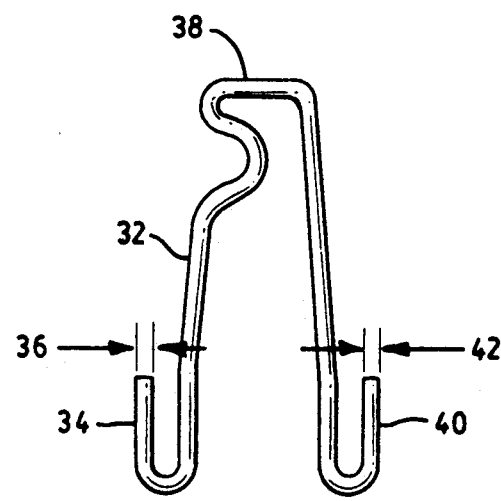
FIG. 3 shows a front view of a preferred embodiment of a support frame.

FIG. 3 shows a front view of a support frame. The preferred support frame 32 is a rigid metal wire structure having coplanar, hooked ends. The frame structure in between the hooked ends may have any convenient design sufficient to act as an interior support for the inner capsule 44. The intermediate, interior support, structure should fit through the lamp neck end 16, into the lamp bulb. Applicant prefers a heavy round wire, or thin rod, formed roughly in a U shape, with hooked ends. The neck end 16 opening has the same diameter as the greatest width of the preferred interior support. A ripple may also be formed in one side of the U to enhance welding contact. The relevant features of the support frame 32 are that the hooked ends have a first exterior arm 34 and a second exterior arm 40 that respectively have nearly the same width, depth and length of the first cross groove 22 and second cross groove 28, and are separated by about the separation between the first cross groove 22 and the second cross groove 28. The support frame 32 may then be inserted through the lamp neck end 16, and the first exterior arm 34 positioned in the first cross groove 22, and the second exterior arm 40 positioned in the second cross groove 28. The closer the fit between the first cross groove 22 and the first exterior arm 34, and between the second cross groove 28 and the second exterior arm 40, the more accurately, and securely located the inner capsule 44. The preferred first exterior arm 34 is round, with a diameter slightly less than or equal to the first cross groove 22 width to thereby fit snuggly in the first cross groove 22.

The outer envelope 12 contains the inner capsule 44, and the support frame 32 supports the inner capsule 44. The inner capsule 44 has a light source 46, a first lead 48, and a second lead 50. The light source may be a filament, or an arc structure. The preferred inner capsule 44 is a press sealed tungsten halogen inner capsule 44 with an internal filament 46 electrically coupled by two round wire leads extending from the press seal. The preferred first lead 48 is a round wire welded to the support frame 32 in the region of the included ripple. The second lead 50 may also be a round wire extending from the press seal of the inner capsule 44. By way of example, inner capsule 44 is shown as a single ended, press sealed tungsten halogen capsule, although it may be of any other suitable configuration, such as a double ended lamp, or arc discharge lamp.

Figure 4:
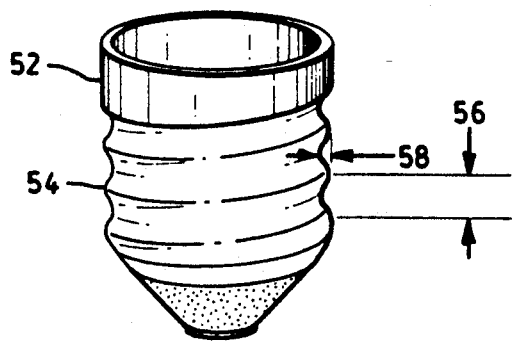
FIG. 4 shows a perspective view of a threaded base.

FIG. 4 shows a perspective view of a threaded base 52. The outer envelope 12 threads to the threaded base 52. The support frame 32 is pinched in place by, and makes electrical contact with the threaded base 52. The threaded base 52 has a base thread 54 with a thread diameter 56, (crest to crest or root to root) and a thread height 58 (root to crest). The base threads 54 are chosen to couple properly with a standard lamp socket. The preferred threaded base 52 also includes a center contact 60 as is typical of standard lamps.

The inner capsule 44, is coupled through the second lead to the center contact 60. The threaded base 52 contains the center contact 60. The second lead 50 is threaded through an eyelet formed in the center contact 60, and then soldered in place.

An electric lamp with a low torque threaded base 52 may be assembled by performing the steps of forming an outer envelope 12 with a bulb end 14, and a threaded neck end 16 with a first cross groove 22 and a second cross groove 28. A inner capsule 44 with an enclosed light source 46, and two electric leads is formed. The inner capsule 44 is welded to the support frame 32 with one lead contacting the support frame 32. The inner capsule 44 and support frame 32 are then inserted in the outer envelope 12, with the first cross groove 22 aligned with the first exterior arm 34, and the second cross groove 28 aligned with the second exterior arm 40. The exterior arms 34, 40 are snuggly held by the close fit, and are exposed above the root line of the envelope thread 20. An epoxy is applied to the envelope neck end 16. The second lead 50 is then positioned through the threaded base 52 via the center contact 60. The outer envelope 12 is then threaded to the threaded base 52, causing the first exterior arm 34 to contact the threaded base 52 and be compressed in the first cross groove 22, and the second exterior arm 40 to contact the threaded base 52 and be compressed in the second cross groove 28. The inner capsule 44 through the first lead 46 and the support frame 32 is then electrically connected by the first exterior arm 34, the second exterior arm 40 contacting the threaded base 52. The epoxy flows slightly from the lock notch 26 to contact and bond with the threaded base 52. The epoxy prevents the threaded base 52 from being removed from the outer envelope 12. Alternatively, a portion of the threaded base 52 may be pressed into the lock notch 26 to prevent the threaded base from being unthreaded from the outer envelope 12. The pressing the threaded base 52 into the lock notch 26 requires care not to chip the envelope 12. The second lead 50 is then soldered to the center contact 60.

In a working example some of the dimensions were approximately as follows: The outer envelope was 9.5 centimeters high, and had a neck with an outer diameter of 2.4 centimeters, and and inner diameter of 1.7 centimeters. The cross grooves were 1.0 centimeters long, 2.0 millimeters wide, and 1.8 millimeters deep from the bottom of the threads. The support frame was a single bent wire having a diameter of 1.5 millimeters (0.06 inch). The exterior arms had smooth surfaces and were substantially parallel to each other and to the cross grooves when positioned in the outer envelope. The exterior arms were about 1.0 centimeter (0.4 inch) long. The exterior arms filled the cross grooves to approach the top of the threads. The lock notch was filled with epoxy that bonded to the threaded base.

With the above working example, several positive results have been found. The support frames are not bent or distorted during manufacture or shipping. The support frames contact the threaded base in a consistent fashion, thereby yielding more consistent location of the inner capsule. Inner capsule contact with the outer envelope has been eliminated. The torque characteristic of the threaded base has been reduced substantially, thereby greatly easing strain on assemblers. The disclosed structures, dimensions, configurations and embodiments are examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An electric lamp comprising:
   a) an outer envelope having a bulb end, a neck end including formed threads with a thread height, a first cross groove extending approximately perpendicular to the threads, having a width and a depth approximately equal the thread height and a length greater than two times the thread height, and a similarly formed second cross groove offset from the first cross groove, and a lock notch formed as an indentation in the neck end,
   b) a support frame, enclosed in the outer envelope having a first exterior arm and a second exterior arm, having respective dimensions allowing each respective exterior arm to be closely fit into the respective first cross groove and second cross groove, and an interior support,
   c) an inner capsule, being mounted on the support frame, and having a light source, a first lead electrically coupled to the support frame, a second lead,
   d) a threaded base being threaded to the outer envelope to trap the first exterior arm in the first cross groove and the second exterior arm in the second cross groove, and having a center contact electrically coupled to the second lead, and being extended into the lock notch to bind the envelope to the threaded base.

2. The lamp in claim 1, wherein the support frame is formed from round wire.

3. The lamp in claim 2, wherein the round wire support frame has a diameter equal to or greater than 1.5 millimeters.

4. The lamp in claim 2, wherein the support frame has a planar configuration.

5. The lamp in claim 2, wherein the support frame has a first hooked end with the wire end forming the first exterior arm, and a similarly formed opposite second hooked end, with the opposite wire end forming the second exterior arm, with the first hooked end, and the second hooked end parallely aligned to simultaneously respectively fit the first exterior arm, and the second exterior arm in the first cross groove and the second cross groove.

6. An electric lamp comprising:
   a) an outer envelope having a bulb end, a neck end including formed threads with a thread height, a first cross groove extending approximately perpendicular to the threads, having a width and a depth approximately equal the thread height and a length greater than two times the thread height, and a similarly formed second cross groove offset from the first cross groove, and a lock notch formed as an indentation in the neck end,
   b) a support frame, enclosed in the outer envelope having a first exterior arm and a second exterior arm, having respective dimensions allowing each respective exterior arm to be closely fit into the respective first cross groove and second cross groove, and an interior support,
   c) an inner capsule, being mounted on the support frame, and having a light source, a first lead electrically coupled to the support frame, a second lead,
   d) a threaded base being threaded to the outer envelope to trap the first exterior arm in the first cross groove and the second exterior arm in the second cross groove, and having a center contact electrically coupled to the second lead, and
   e) an epoxy positioned in the lock notch intermediate the envelope and the threaded base to bond the envelope to the threaded base.

7. The lamp in claim 6, wherein the support frame has a planar configuration.

8. An electric lamp comprising:
   a) an outer envelope having a bulb end, a neck end including formed threads with a thread height, a first cross groove extending approximately perpendicular to the threads, having a width and a depth approximately equal the thread height and a length greater than two times the thread height, and a similarly formed second cross groove offset from the first cross groove,
   b) a support frame, enclosed in the outer envelope having a first exterior arm and a second exterior arm, having respective dimensions allowing each respective exterior arm to be closely fit into the respective first cross groove and second cross groove, and an interior support,
   c) an inner capsule, being mounted on the support frame, and having a light source, a first lead electrically coupled to the support frame, a second lead,
   d) a threaded base being threaded to the outer envelope to trap the first exterior arm in the first cross groove and the second exterior arm in the second cross groove, and having a center contact electrically coupled to the second lead, and
   e) an epoxy positioned intermediate the envelope and the threaded base to bond the envelope to the threaded base.

9. The lamp in claim 8, wherein the support frame has a planar configuration.

* * * * *